US011295757B2

(12) United States Patent
Buddhadev et al.

(10) Patent No.: US 11,295,757 B2
(45) Date of Patent: Apr. 5, 2022

(54) DETECTION AND CLASSIFICATION OF SIREN SIGNALS AND LOCALIZATION OF SIREN SIGNAL SOURCES

(71) Applicant: Motional AD LLC, Boston, MA (US)

(72) Inventors: Jugal Buddhadev, Avalon, PA (US); Rajesh K. Venkateswaran, Sewickley, PA (US); Alok Sharma, Pittsburgh, PA (US); Yunpeng Xu, Pittsburgh, PA (US); Michael Lee, Wexford, PA (US); Paul Schmitt, Merrimack, NH (US); Matthew Andromalos, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/752,595

(22) Filed: Jan. 24, 2020

(65) Prior Publication Data
US 2021/0233554 A1    Jul. 29, 2021

(51) Int. Cl.
*G10L 25/51* (2013.01)
*G10L 25/18* (2013.01)
(Continued)

(52) U.S. Cl.
CPC ............. *G10L 25/51* (2013.01); *G10L 25/18* (2013.01); *G10L 25/24* (2013.01); *G10L 25/30* (2013.01); *H04R 1/406* (2013.01); *H04R 3/005* (2013.01)

(58) Field of Classification Search
CPC ......... G10L 25/51; G10L 25/18; G10L 25/24; G10L 25/30; H04R 1/406; H04R 3/005
(Continued)

(56) References Cited

U.S. PATENT DOCUMENTS 9,275,136 B1    3/2016  Sharifi et al.
2016/0343247 A1  11/2016  Strassberger
(Continued)

FOREIGN PATENT DOCUMENTS

DE    102016118902    4/2017
DE    102020104360    10/2020
(Continued)

OTHER PUBLICATIONS

U.S. Appl. No. 16/804,029, filed Feb. 28, 2020, Meijburg.
(Continued)

*Primary Examiner* — Vivian C Chin
*Assistant Examiner* — Douglas J Suthers
(74) *Attorney, Agent, or Firm* — Fish & Richardson P.C.

(57) ABSTRACT

In an embodiment, a method comprises: capturing, by one or more microphone arrays of a vehicle, sound signals in an environment; extracting frequency spectrum features from the sound signals; predicting, using an acoustic scene classifier and the frequency spectrum features, one or more siren signal classifications; converting the one or more siren signal classifications into one or more siren signal event detections; computing time delay of arrival estimates for the one or more detected siren signals; estimating one or more bearing angles to one or more sources of the one or more detected siren signals using the time delay of arrival estimates and a known geometry of the microphone array; and tracking, using a Bayesian filter, the one or more bearing angles. If a siren is detected, actions are performed by the vehicle depending on the location of the emergency vehicle and whether the emergency vehicle is active or inactive.

39 Claims, 16 Drawing Sheets

(51) Int. Cl.
*G10L 25/24* (2013.01)
*G10L 25/30* (2013.01)
*H04R 1/40* (2006.01)
*H04R 3/00* (2006.01)

(58) Field of Classification Search
USPC .......................................................... 381/56
See application file for complete search history.

(56) References Cited

U.S. PATENT DOCUMENTS

| | | |
|---|---|---|
| 2017/0249839 A1 | 8/2017 | Becker et al. |
| 2017/0305427 A1 | 10/2017 | Kim et al. |
| 2018/0088887 A1 | 3/2018 | LeBlanc et al. |
| 2018/0137756 A1 | 5/2018 | Moosaei |
| 2018/0374347 A1* | 12/2018 | Silver .................... G06F 16/683 |
| 2019/0027032 A1 | 1/2019 | Arunachalam |
| 2019/0035269 A1 | 1/2019 | Donovan |
| 2019/0049989 A1* | 2/2019 | Akotkar ................ G05D 1/0255 |
| 2020/0241552 A1 | 7/2020 | Leenayongwut |
| 2020/0276973 A1 | 9/2020 | Meijburg et al. |

FOREIGN PATENT DOCUMENTS

| | | |
|---|---|---|
| IN | 3630MU2013 A | 12/2013 |
| JP | 2014154128 | 8/2014 |
| WO | WO 2016/196003 | 12/2016 |

OTHER PUBLICATIONS

[No Author Listed], "J3016: Taxonomy and Definitions for Terms Related to On-Road Motor Vehicle Automated Driving Systems" SAE International, Sep. 2016, 30 pages.

Abu-El-Haija et al., "YouTube-8M: A Large-Scale Video Classification Benchmark," arXiv: 1609.08675 [cs.CV], Sep. 27, 2016, 10 pages.

Klee et al., "Kalman Filters for Time Delay of Arrival-Based Source Localization," Hindawi Publishing Corporation EURASIP Journal on Applied Signal Processing, 2006, Article ID 12378, 15 pages.

Knapp et al., "The Generalized Correlation Method for Estimation of Time Delay," IEEE Transactions on Acoustics, Speech and Signal Processing, Aug. 1976, 24(4):320-327.

Mizumachi et al., "Robust Sensing of Approaching Vehicles Relying on Acoustic Cues," Sensors 2014, May 30, 2014, 14(6):9546-9561.

Salamon et al., "A Dataset and Taxonomy for Urban Sound Research," 22nd ACM International Conference on Multimedia, Orlando, FL, USA, Nov. 2014, 1041-1044.

Senocak et al., "Learning to Localize Sound Source in Visual Scenes," arXiv: 1803.03849v1 [cs.CV], Mar. 10, 2018, 9 pages.

Simonyan et al., "Very Deep Convolutional Networks for Large-Scale Image Recognition," arXiv: 1409.1556v6 [cs.CV], Apr. 10, 2015, 14 pages.

Valin et al., "Robust Sound Source Localization Using a Microphone Array on a Mobile Robot," Proceedings of IEEE/RSJ International Conference on Intelligent Robots and Systems (IROS), Oct. 27-31, 2003, 1228-1233.

U.S. Appl. No. 16/752,594, filed Jan. 24, 2020, Leenayongwut.

U.S. Appl. No. 17/458,239, filed Aug. 26, 2021, Schmitt.

Bochkovskiy et al., "Yolov4: Optimal speed and accuracy of object detection. arXic preprint," arXiv:2004, Apr. 23, 2020, 17 pages.

Liu et al., "Ssd: Single shot multibox detector," European Conference on Computer Vision, October 8. 2016, 21-37.

Ren et al., "Faster r-cnn: Towards real-time object detection with region proposal networks," Advances in Neural Information Processing Systems, Jun. 2015, 28:91-9.

Yabuuchi et al., "Real-time traffic light detection with frequency patterns using a high-speed camera," Sensors, Jul. 2020, 20(14):4035, 18 pages.

* cited by examiner

DETECTION AND CLASSIFICATION OF SIREN SIGNALS AND LOCALIZATION OF SIREN SIGNAL SOURCES

FIELD OF THE INVENTION

The description that follows relates generally to detection and classification of siren signals, and the localization of the siren signal sources (e.g., the location of emergency vehicles.)

BACKGROUND

There are a number of sensors available for an autonomous vehicle to identify its environment, such as cameras, LiDAR and RADAR. A relatively less explored area, however, is sound signals. When human drivers are driving on roads, there are scenarios where sound signals are indispensable for the safe operation of a vehicle. For example, human drivers rely on siren signals to decide whether they should pull over to let an emergency vehicle pass. Studies on insurance claims against emergency medical service agencies in the United States (2003-2004) have shown that the most frequent claims were for emergency vehicle accidents and patient handling mishaps. Moreover, statistics indicate that most accidents between emergency vehicles and motorists occur at intersections. Accordingly, adding sound signals to the sensor stack of an autonomous vehicle will benefit the perception and planning processes implemented by the autonomous vehicle, thereby potentially reducing the risk of emergency vehicle related accidents.

SUMMARY

Techniques are provided for detection and classification of siren signals, and the localization of the siren signal sources. One or more microphone arrays capture sound signals from an environment in which an autonomous vehicle is operating. The sound signals are pre-processed using a bandpass filter configured with a passband to pass a known range of frequencies of siren signals and to attenuate all other signals. Frequency spectrum features are extracted from the sound signals and input into a sound event detector that performs acoustic scene classification and converts the classifications into sound detection events. The sound event detector uses a deep learning model, such as a convolutional neural network (CNN) to predict labels that indicate the presence or absence of one or more siren signals with a specified confidence level. When the presence of a siren signal is predicted, the sound event detector informs a sound source localizer of the event. The sound source localizer computes time delay of arrival estimates using a maximum likelihood criterion obtained by implementing a generalized cross correlation method. The sound source localizer uses the time delay of arrival estimates to estimate the bearing angle of the siren signal source at each microphone array. The bearing angles are then used in a triangulation algorithm to compute a range to the one or more siren signal sources (e.g., the range to an emergency vehicle).

In an embodiment, a method comprises: capturing, by one or more microphone arrays of a vehicle, sound signals in an environment; extracting, using one or more processors, frequency spectrum features from the sound signals; predicting, using an acoustic scene classifier and the frequency spectrum features, one or more siren signal classifications; converting, using the one or more processors, the one or more siren signal classifications into one or more siren signal event detections; computing time delay of arrival estimates for the one or more detected siren signals; estimating, using the one or more processors, one or more bearing angles to one or more sources of the one or more detected siren signals using the time delay of arrival estimates and a known geometry of the microphone array; and tracking, using a Bayesian filter, the one or more bearing angles.

In an embodiment, the time delay of arrival estimates are computed using a maximum likelihood criterion obtained by implementing a generalized cross correlation method.

In an embodiment, the method further comprises estimating a range to the one or more siren signal sources by applying triangularization to the one or more bearing angles.

In an embodiment, transforming sound signals into frequency spectrum features includes generating one of a spectrogram, mel-spectrogram or mel-frequency cepstral coefficients (MFCC) from the frequency spectrum.

In an embodiment, the acoustic scene classifier is a neural network (e.g., a CNN).

In an embodiment, the Bayesian filter is one of a Kalman filter, extended Kalman filter, unscented Kalman filter or particle filter.

In an embodiment, predicting, using an acoustic scene classifier and the frequency spectrum features, of one or more siren signal classifications further comprises continuously predicting labels indicative of the presence or absence of one or more siren signals and their respective start and end times.

In an embodiment, the one or more bearing angles are estimated using a spatio-temporal difference of the siren signal at each microphone pair in the microphone array.

In an embodiment, the labels that indicate the presence of different types of sirens.

In an embodiment, the different types of siren signals include but are not limited to wailing, yelp, hi-lo, rumbler, and mechanical wail sirens.

In an embodiment, a system comprises: one or more processors and memory storing instructions that when executed by the one or more processors, cause the one or more processors to perform the steps of any of the preceding methods.

One or more of the disclosed embodiments provide one or more of the following advantages. One or more microphone arrays are used to capture sound signals in an environment in which an autonomous vehicle is operating. The sound signals are processed to detect and classify the presence (or absence) of one or more siren signals and to determine the bearing angle and range to each siren signal source. After the siren signal source(s) are located, the autonomous vehicle can use the locations to generate a plan, route or trajectory for the autonomous vehicle to reduce the risk of collision with emergency vehicle(s) or other vehicles or objects in the environment, and/or to avoid traveling in areas where emergency services are being performed (e.g., fires, traffic accidents). The detected and classified siren signals and the localized siren signal sources can also be fused with other sensor data in a perception pipeline of the autonomous vehicle and/or used by other systems and/or processes of the autonomous vehicle, and/or shared with other autonomous vehicles (e.g., in a fleet of vehicles) either directly (e.g., through V2V communication) or through a centralized service platform.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
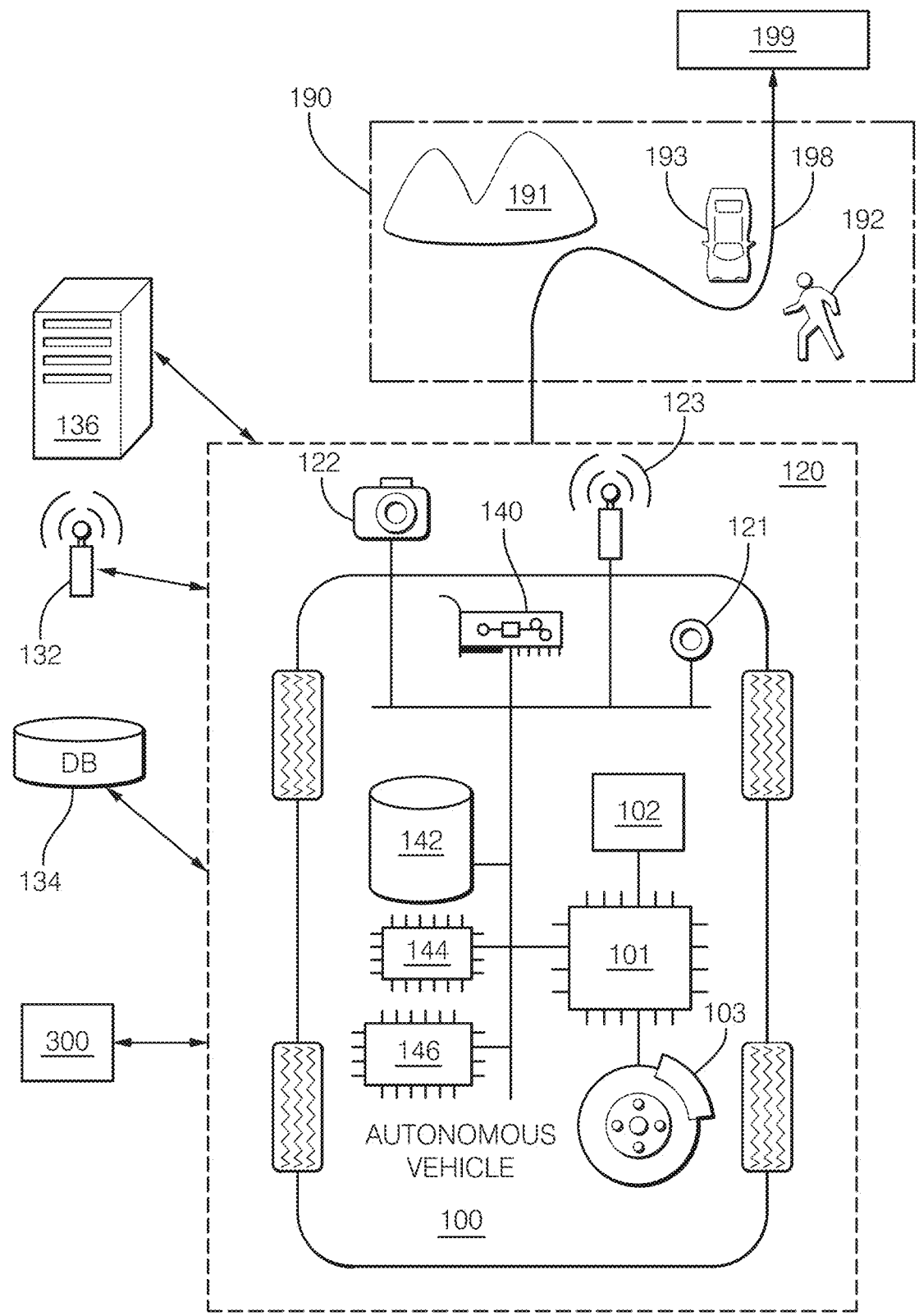
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Autonomous Vehicle Inputs
5. Autonomous Vehicle Planning
6. Autonomous Vehicle Control
7. Detection and Classification of Siren Signals and Localization of Siren Signal Sources

General Overview

Techniques are provided for detection and classification of siren signals, and the localization of the siren signal sources. One or more microphone arrays capture sound signals from an environment in which an autonomous vehicle is operating. The sound signals are pre-processed using a bandpass filter configured with a passband to pass a known range of frequencies of siren signals and to attenuate all other signals. Frequency spectrum features are extracted from the sound signals and input into a sound event detector (e.g., a CNN) performs acoustic scene classification to predict labels that indicate the presence or absence of one or more siren signals with confidence scores. When a siren signal classification occurs, the sound event detector converts the siren signal classification into a sound detection event and informs a sound source localizer of the event. The sound source localizer computes time delay of arrival estimates using a maximum likelihood criterion obtained by implementing a generalized cross correlation method. The sound source localizer uses the time delay of arrival estimates to estimate the bearing angle of the siren signal source at each microphone array. The bearing angles are then used in a triangulation algorithm to compute a range to the siren signal source (e.g., the range to an emergency vehicle).

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
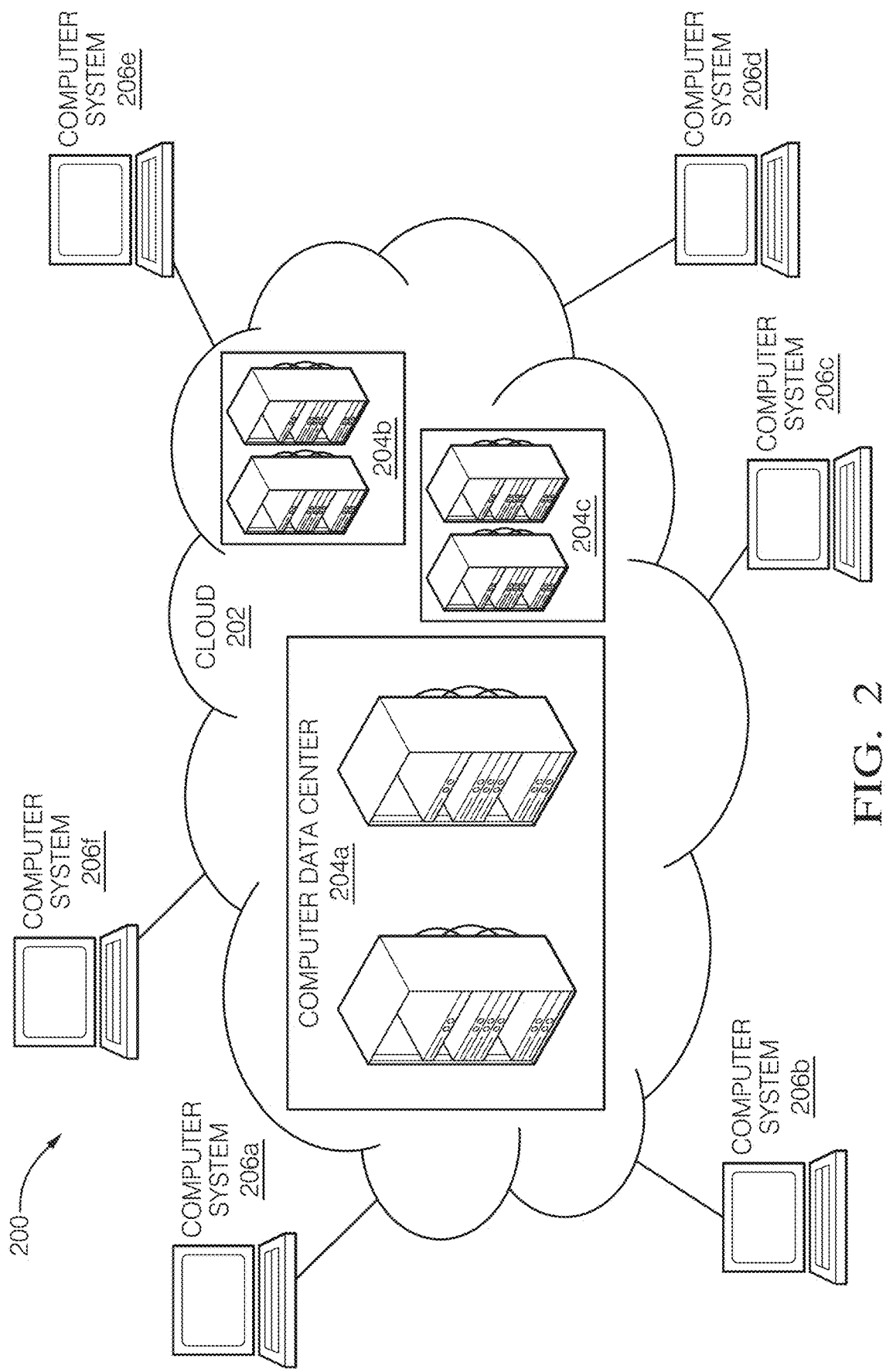
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Computer System

Figure 3:
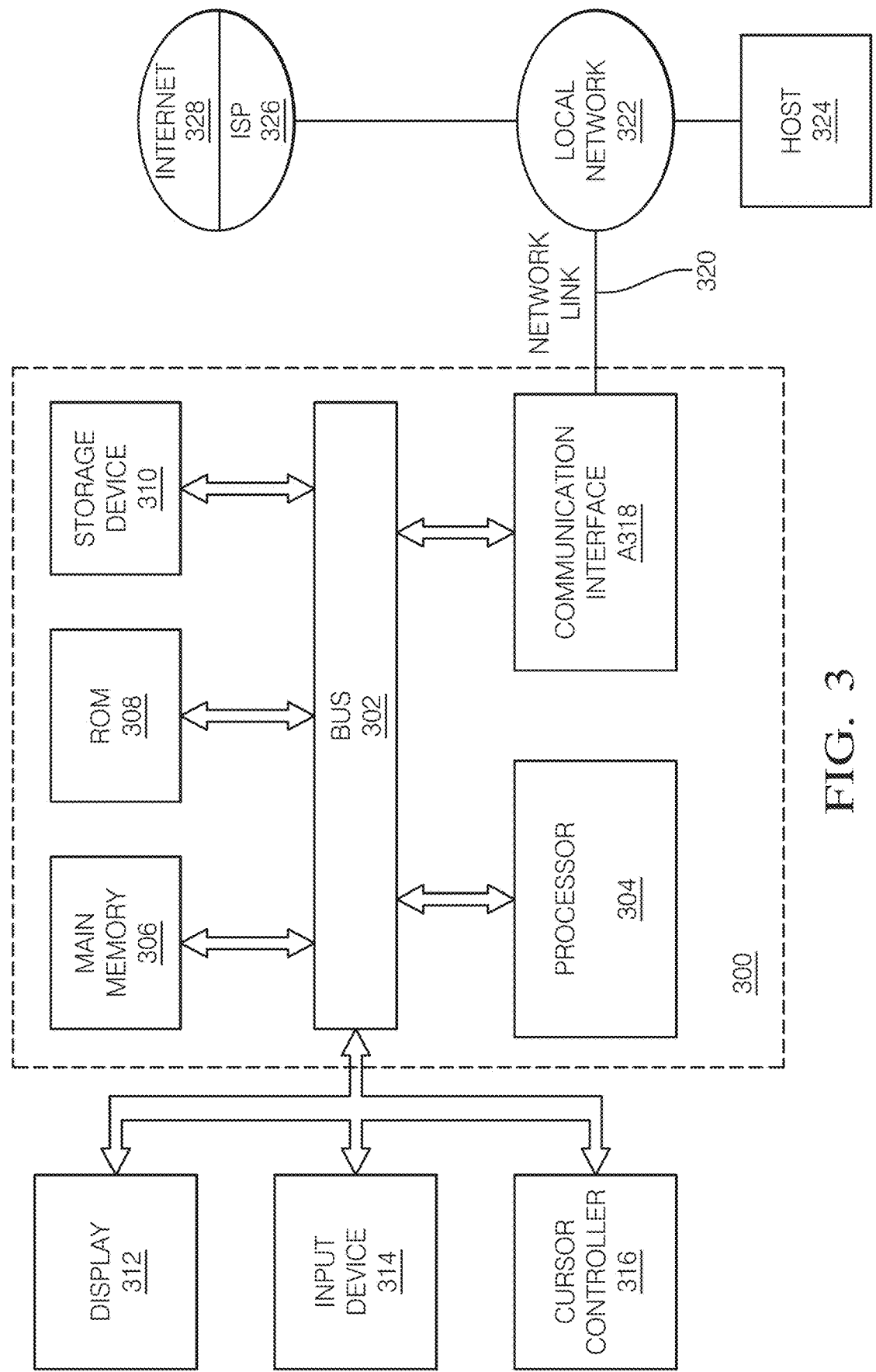
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
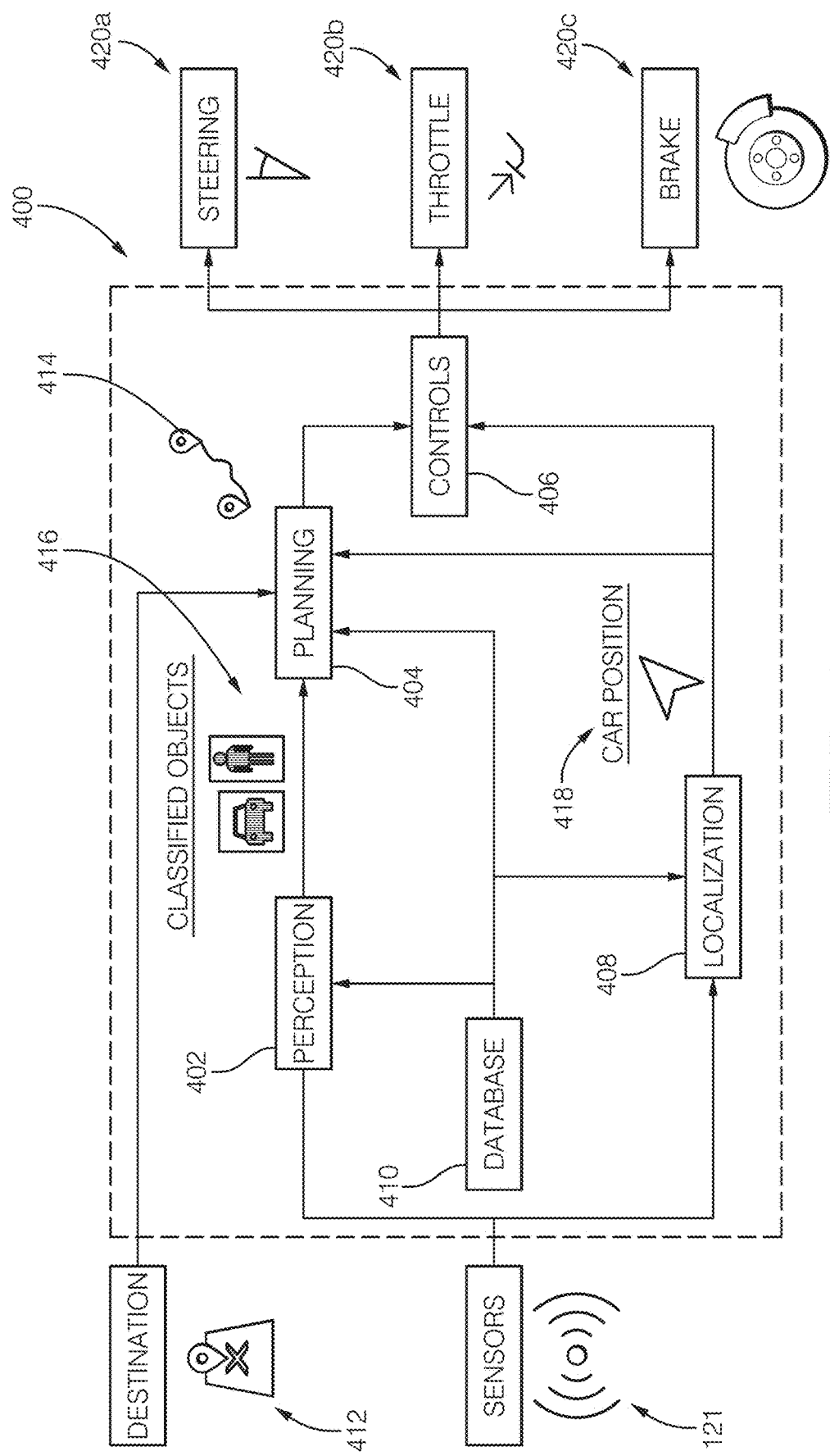
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
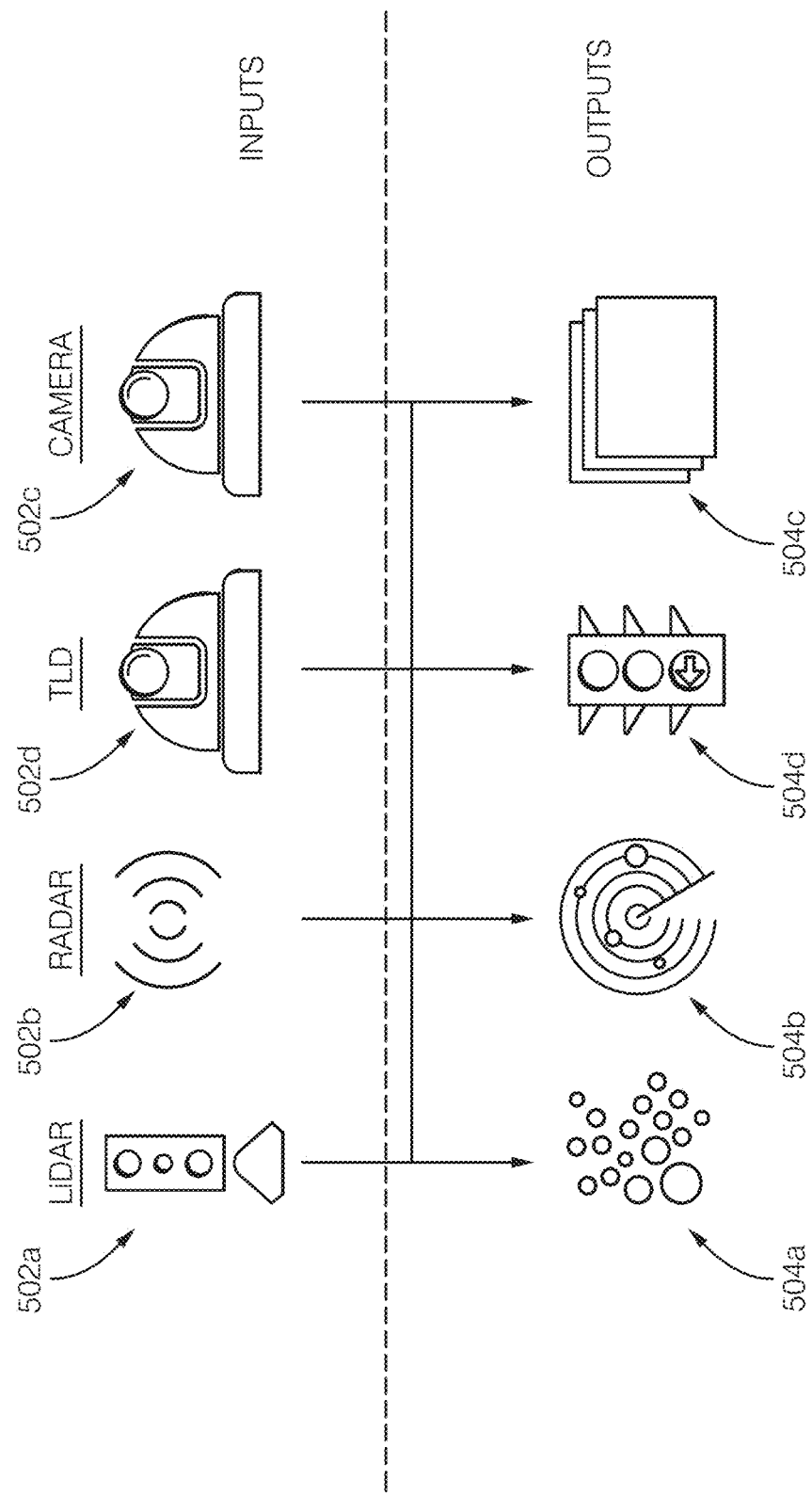
FIG. 5 shows an example of inputs and outputs that may be used by a perception module, in accordance with one or more embodiments.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
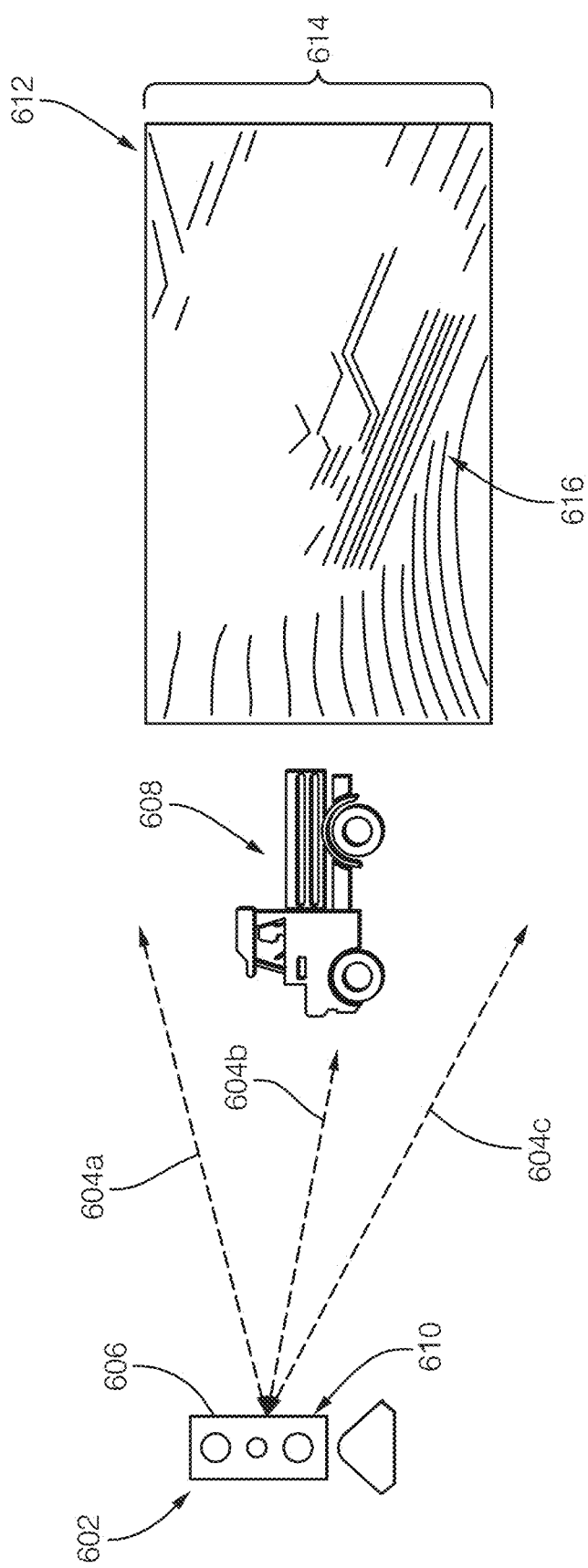
FIG. 6 shows an example of a LiDAR system, in accordance with one or more embodiments.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
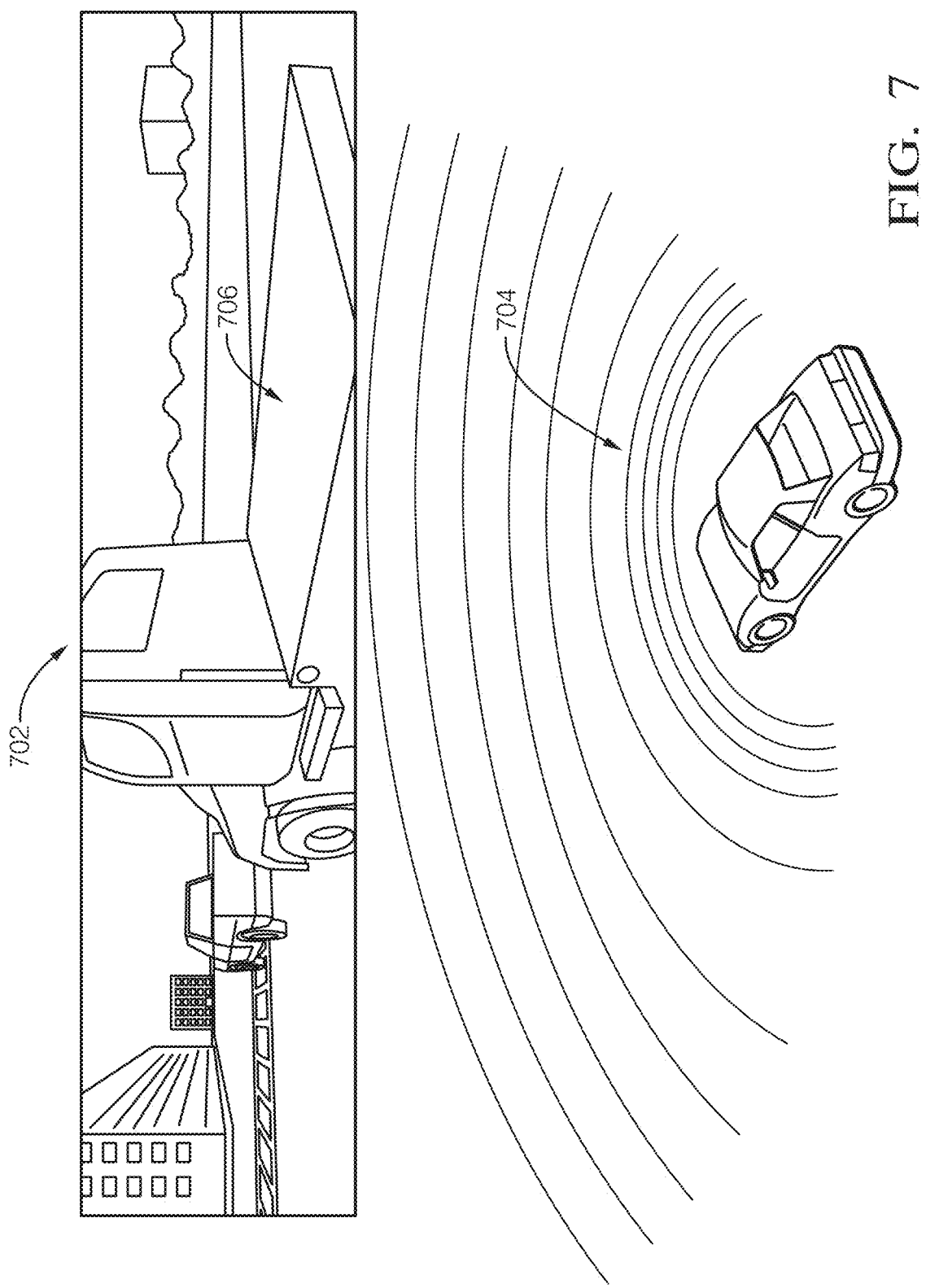
FIG. 7 shows the LiDAR system in operation, in accordance with one or more embodiments.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
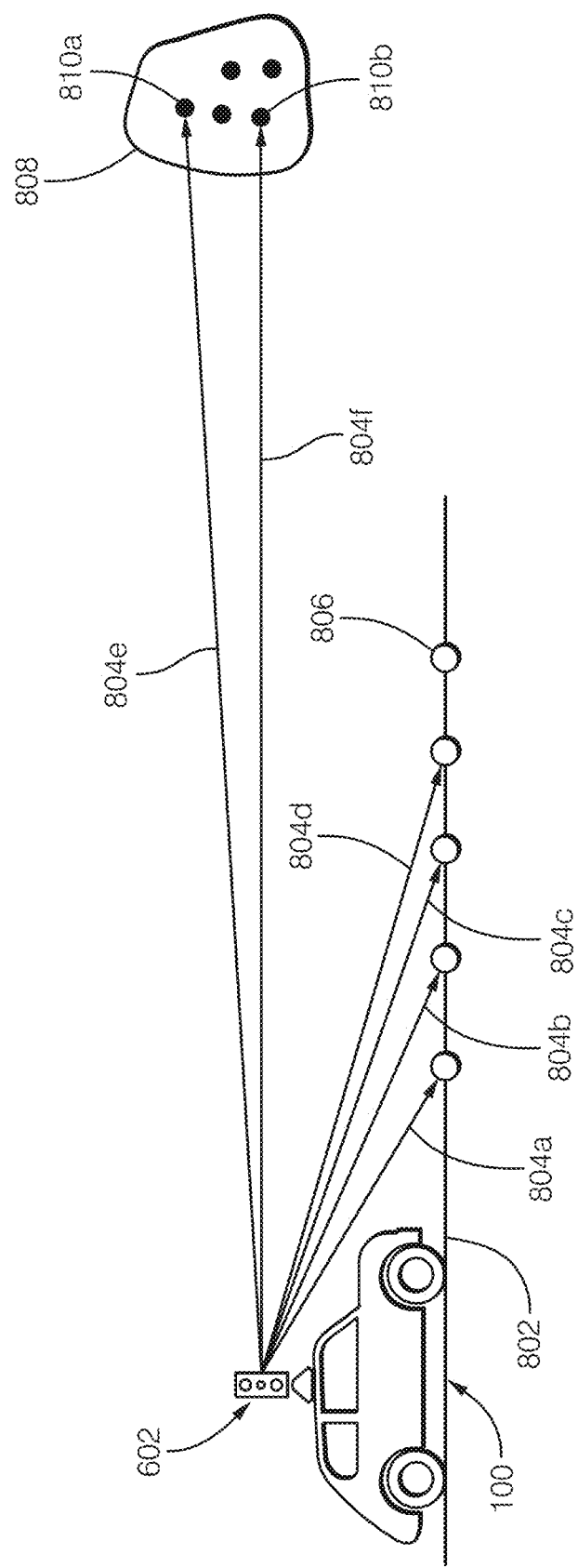
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
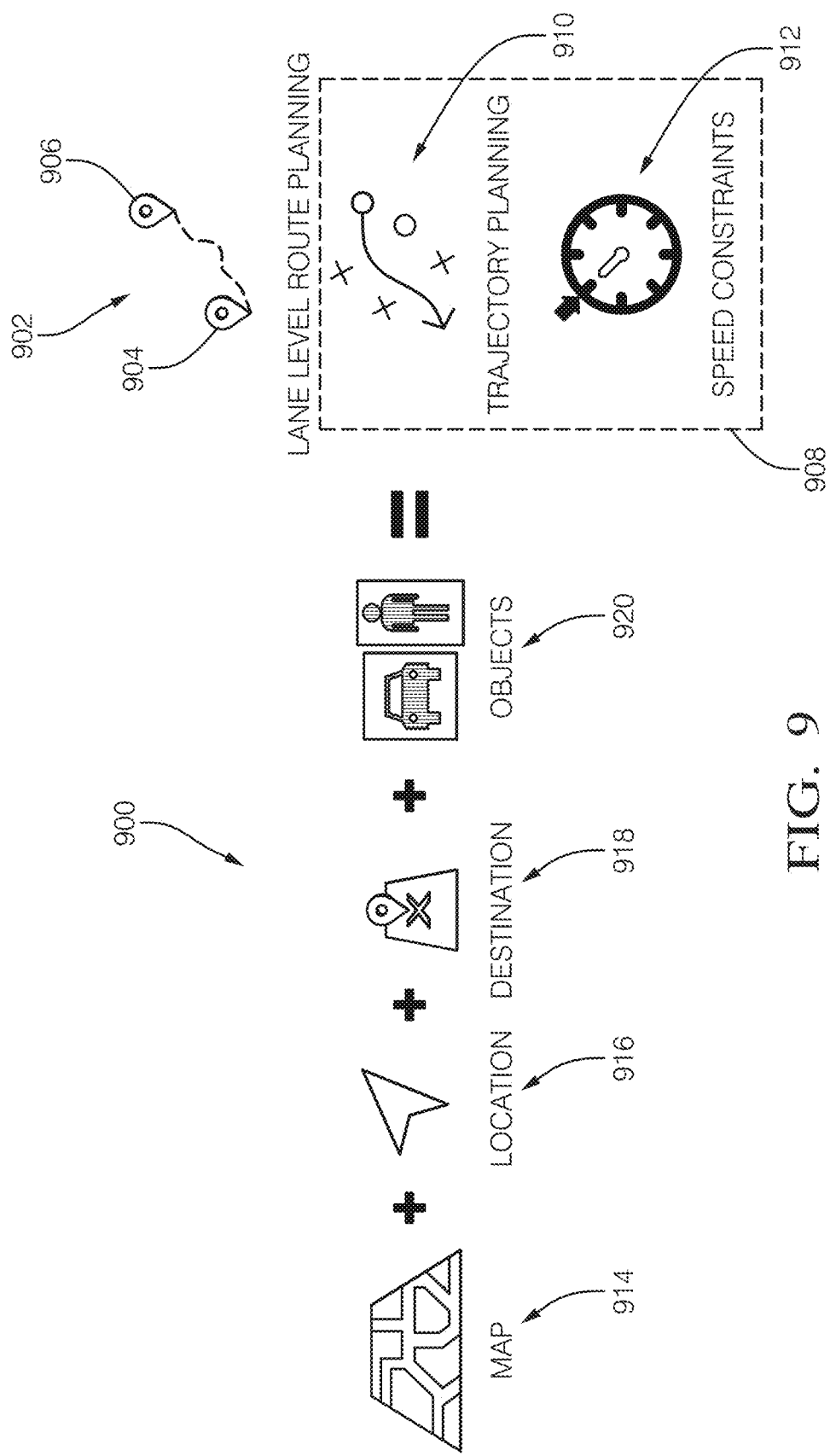
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
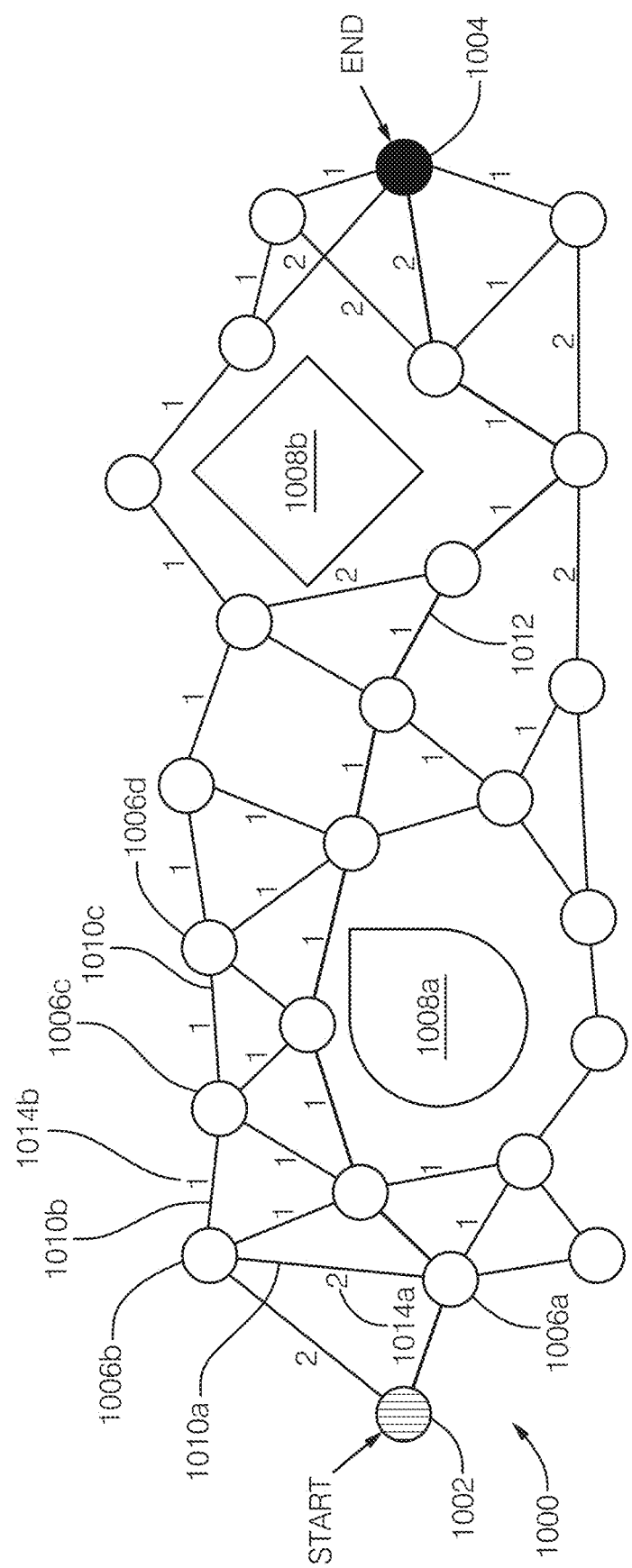
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
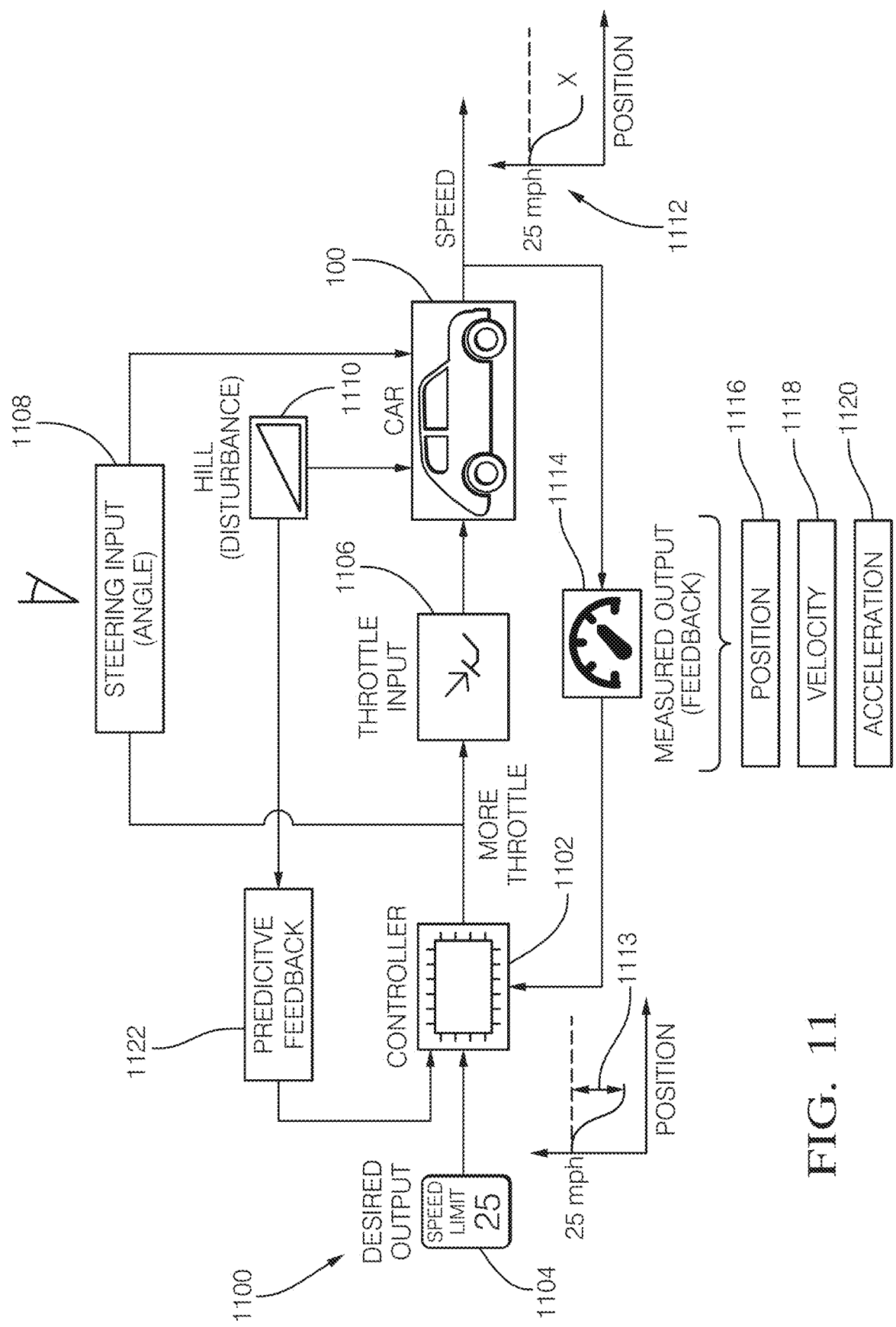
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
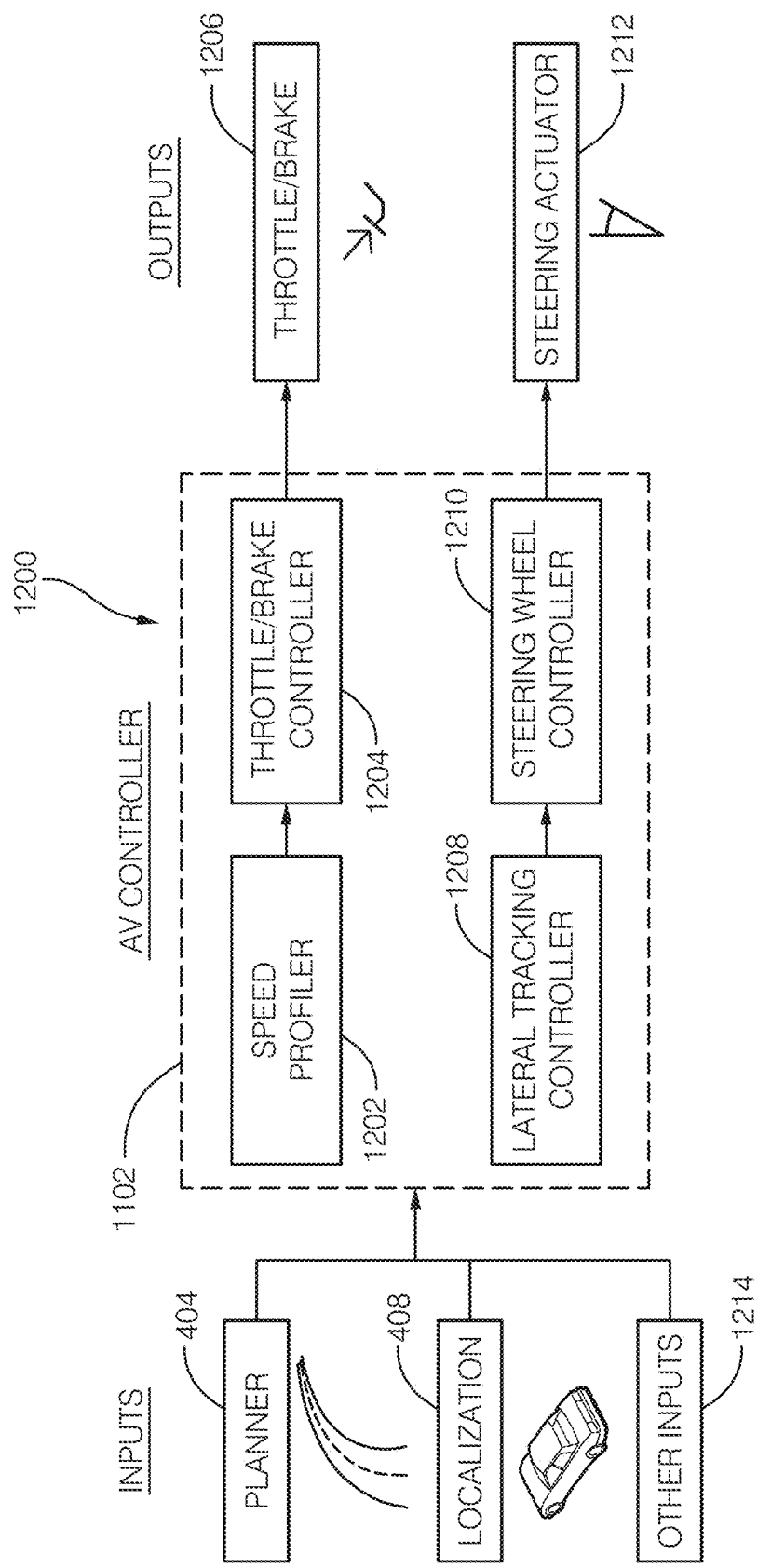
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Figure 13:
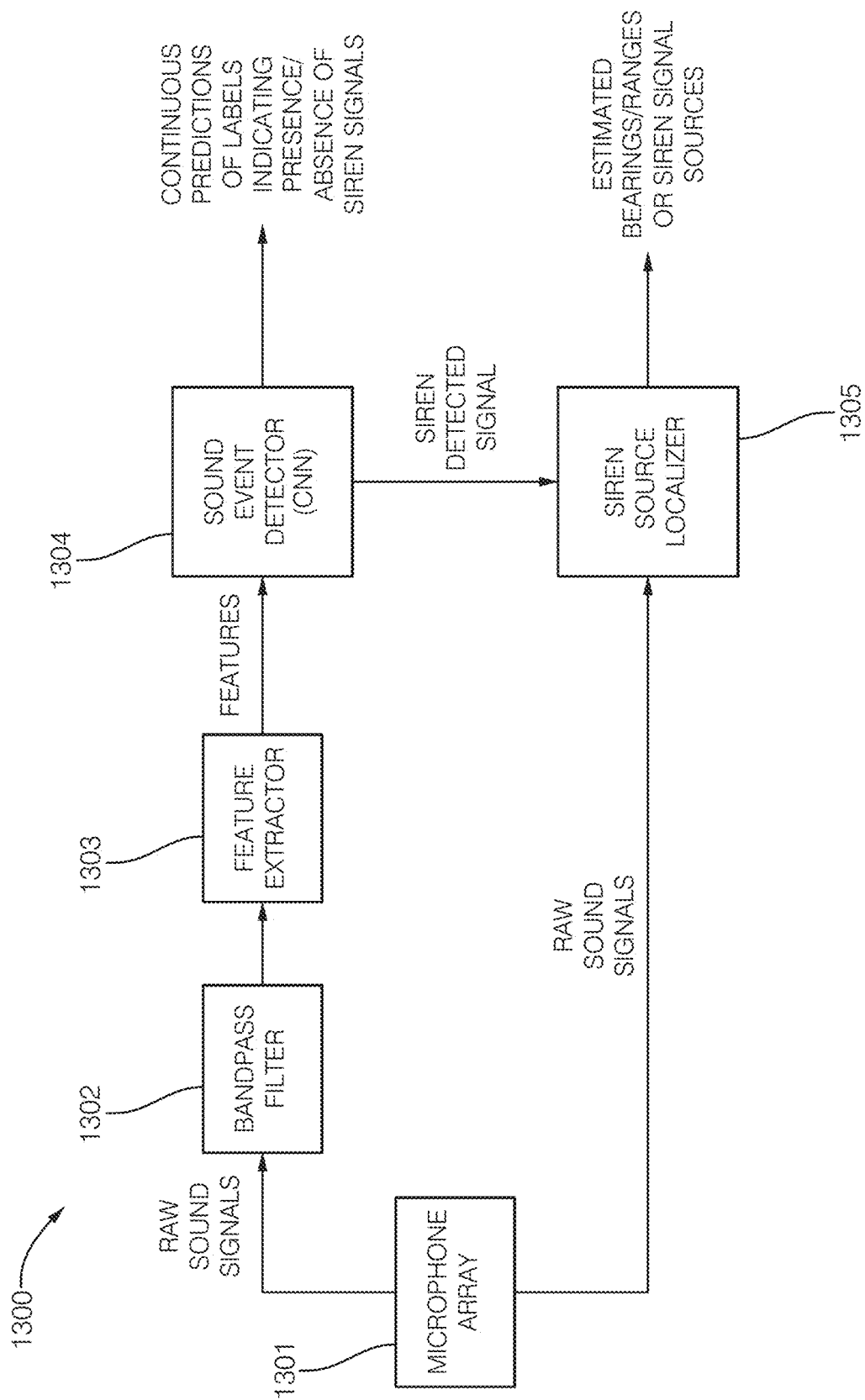
FIG. 13 is a block diagram of a system for detecting and classifying siren signals, and localizing the siren signal sources, in accordance with one or more embodiments.

Detection and Classification of Sirens Signals, and Localization of Siren Signal Sources FIG. 13 is a block diagram of system 1300 for detecting and classifying sirens and localizing the siren signal sources, in accordance with one or more embodiments. System 1300 includes one or more microphone arrays 1301, bandpass filter 1302, feature extractor 1303, sound event detector (SED) 1304 and sound source localizer (SSL) 1305. System 1300 is implemented in hardware, software or a combination of hardware and software.

A typical siren signal transmitted by an emergency vehicle exists in a frequency range of 500 Hz to 2000 Hz. The oscillation frequency of the siren signal varies based on the type of siren signal. Siren signals can be visualized in the frequency domain using a fast Fourier Transform (FFT) or a spectrogram plot. There are many different types of siren signals used by emergency vehicles: 1) electronic wail (used by ambulances and police cars); 2) rumbler; 3) yelp, 4) hi-lo; 5) mechanical wail (e.g., used by fire trucks); 6) chirp; 7) pulsar; and 8) localizer The 2-tone (hi-lo) siren signal has discrete tones of 540 Hz and 660 Hz with each tone present for about 0.575 s. The wail siren signal sweeps non-linearly between 800-1700 Hz with a sweep period of about 4.92 s. The yelp siren signal has identical bandwidth to the wail siren with an increased sweep period of about 0.32 s. The chirp siren signal contains a mix of two sirens. A burst of yelp for about 0.96 s, then about 0.32 s of silence, a chirp sweeping between 3110-7000 Hz in only about 0.192 s and finally another 0.32 s of silence. The whole repetition of the chirp siren signal is about 2 s. The pulsar siren signal contains 14 discrete continuous tones within the nominal yelp bandwidth. However, the pulsating nature of the pulse siren signal is created by subtracting a yelp siren signal of about 0.448 s sweep time from the continuous tones. The localiser siren signal is based on a white noise and yelp mix. The localizer siren signal sweeps between 500-1800 Hz with a sweep period of about 0.384 s. The white noise bursts exist for about 0.256 s centered over the highest portion of the sweep frequency and separated in time by about 0.128 s.

Figure 14A:
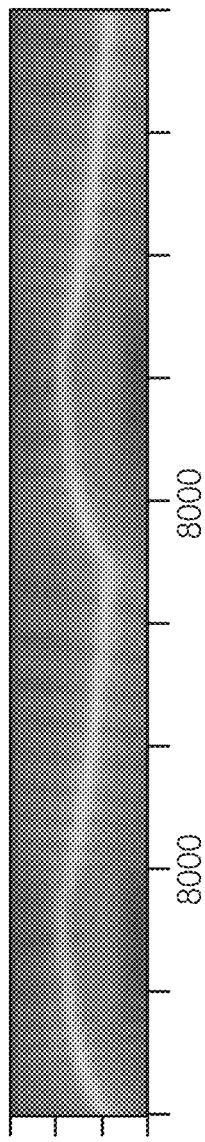
FIGS. 14A-14C are spectrogram plots of different types of siren signals, in accordance with one or more embodiments.
Figure 14B:
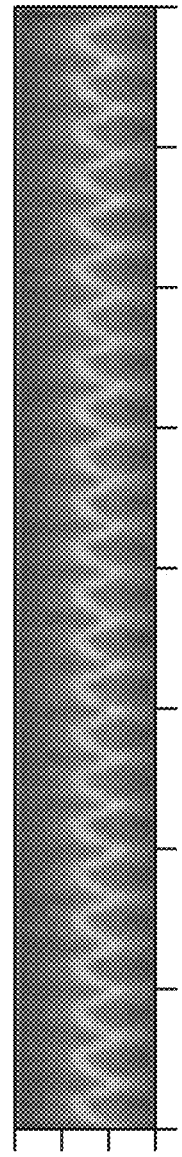
Figure 14C:
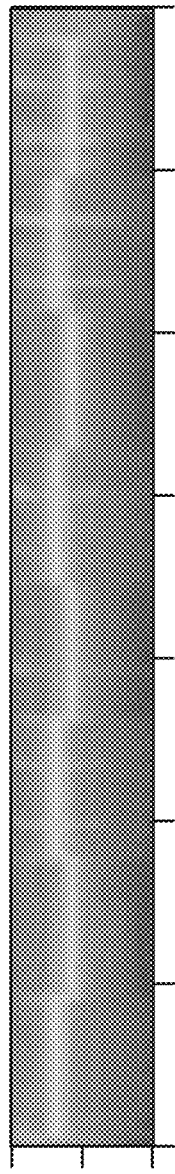

FIGS. 14A-14C are spectrogram plots of wail, yelp and hi-low siren signals, respectively. In the description that follows, wail, yelp and rumbler (a type of pulsar siren) siren signals are described. Regardless of the specific types of siren signals to be detected, there are two distinctive features from a signal-processing perspective: 1) the siren signals are banded in the frequency range between 500 Hz and 2000 Hz, and 2) the shift of the pitch with the largest amplitude creates distinctive patterns in the time domain. If we view the spectrogram of a siren signal, which is the visual representation of the time-frequency spectrum of the siren signal, it is apparent that classifying a siren signal is similar to image recognition in deep learning, as described below in further detail.

Referring again to FIG. 13, microphone array 1301 includes multiple microphones, such as multiple omnidirectional microphones, directional microphones, or a mix of omnidirectional and directional microphones distributed about a perimeter of a space. In an embodiment, microphone array 1301 includes a number of closely spaced microphones. One or more microphone arrays 1301 can be mounted on the AV at any suitable location (e.g., the roof top). In an embodiment, microphone array 1301 can be fixed to the vehicle body or mounted on a gimbaled platform that allows the microphone array 1301 to be rotated into any desired orientation either manually or automatically by an actuator and control system. In an embodiment, one or more microphone arrays 1301 mounted on the AV are used in an AV perception pipeline with one or more microphones or microphone arrays located remote to the vehicle, such as a microphone array attached to a traffic light at an intersection. In an embodiment, microphone array 1301 includes at least 4 microphones mounted on the roof of the vehicle.

The raw sound signals in the environment are captured by microphone array 1301 that outputs the raw sound signals to bandpass filter 1302. Bandpass filter 1302 is configured with a passband across known regions of siren signal frequency and attenuates all other signals outside the passband. The filtered audio is input into feature extractor 1303.

Feature extractor 1303 applies one or more extraction algorithms to the filtered sound signals to extract two-dimensional time-frequency spectrum features. Some examples of extraction algorithms include but are not limited to: spectrogram, mel-spectrogram and mel-frequency cepstral coefficients (MFCC). Feature extractor 1303 performs a frequency transform (e.g., Fast Fourier Transform (FFT)) to convert the filtered sound signals (an array of amplitude and time sequences) into a two-dimensional (2D) time-frequency spectrum, which in an embodiment is implemented as a three-dimensional array that includes frequency, amplitude and time data. The three dimensional array is input into sound event detector (SED) 1304.

In an embodiment, SED 1304 performs acoustic scene classification on the 2D time-frequency spectrum features output by feature extractor 1303 using a deep learning model applied over a discrete length of time, and converts the acoustic scene classifications to sound event detections without extensively labeling event start times or stop times. In an embodiment, SED 1304 includes a convolutional neural network (CNN) that is trained to detect and classify siren sound signals, such as the example siren signals illustrated in FIGS. 14A-14C. In an embodiment, SED 1304 analyzes the 2D time-frequency spectrum features of sound signal output by bandpass filter 1302 and outputs continuous label prediction at a user-specified frequency between four classes: the presence of one or more of three types of siren signals (e.g., wail, yelp, hi-lo) and no presence of a siren signal. More or fewer siren signal classes can be used in other embodiments.

SED 1304 uses the similarity between a sound spectrum and an image spectrum to train the CNN to classify siren signals. For example, the color density of an image ranges from 0-255 whereas sound specta are real numbers. This difference seems trivial but will impact computations the most. As most image recognition systems use an integer type to represent the color scale, siren signal detection requires a floating precision. In image recognition, the training set is a fixed set of images at fixed resolution. For example, the modified national institute of standards and technology (MNIST) dataset has 28×28 pixels resolution. For siren signal detection, however, the resolution of the frequency spectrum is not fixed. This provides an advantage for siren signal detection compared to traditional image recognition as resolution can be fine tuned in both time and frequency for optimum classification accuracy by, for example, changing the training dataset. Compared to image recognition, siren signal detection in theory is less complex as the main features of the spectrum are extracted early-on using a CNN because the method relies more on global features in both time and frequency than the local features relied upon in image recognition.

There a few different algorithms to extract features from the sound signals, among the most used are spectrogram, MFCC and mel-scaled spectrum. In an embodiment, a spectrogram of a sound signal is generated by computing a time-resolved Fourier transform (FT) of the sound signal. Computationally, this is done by continuously computing FTs of a set of finite-width signal windows with adjustable overlapping length. If the time and frequency resolutions are $N_t$ and $N_f$, then the computational cost is $N_t * N_f * \log_2 N_f$.

MFCC is based on the spectrogram and performs the following additional steps: 1) map the frequency to mel-scale which closely mimics the scale that a human ear hears melody; 2) perform a set of convolutions by using triangular windows; 3) compute the log of the spectrogram; and 4) perform a discrete cosine transform on the log of the spectrogram to generate the MFCC. The total computational cost is $N_f * \log_2 (N_f) * N_t + N_{filter} * N_f * N_t + N_{filter} * \log_2 (N_{filter}) * N_t$, where $N_{filter}$ is the number of triangular filters used in the convolution. The mel-scaled spectrogram is essentially the spectrogram scaled to mel-frequency. Note MFCC is much more expensive than spectrogram and mel-scaled spectrogram computationally.

In an embodiment, a spectrogram with 0.03 s time resolution and 64 FFT points is used by SED 1304, which translates to a 33×34 image for each 1 s of audio signal. In an embodiment, data augmentation technique are used on the same siren signal dataset which translates to a total of 46630 training set and a 5360 validation set. The siren signal dataset can be augmented by time shifting, pitch shifting and multiple audio extraction. Time shifting fast forwards or slows the time by a specified factor, pitch shifting moves the pitch up or down by a specified factor and multiple audio extraction extracts audio from multiple audio files, where the length of the extracted audio and the number of audio files is variable. In an embodiment, the technique of average precision (AP) is used to evaluate performance of SED 1304.

The output of SED 1304 is a continuous prediction of labels that indicate the presence or absence of siren signals and a siren detected signal if a siren is detected with a specified level of confidence based on a confidence score output by SED 1304. The siren detected signal is used to inform SSL 1305 that the presence of a siren signal has been detected. The siren detected signal can be a binary signal (e.g. "1"=siren detected, "0"=no siren detected) or any other suitable signal, such as Boolean or multi-symbol code.

Figure 15:
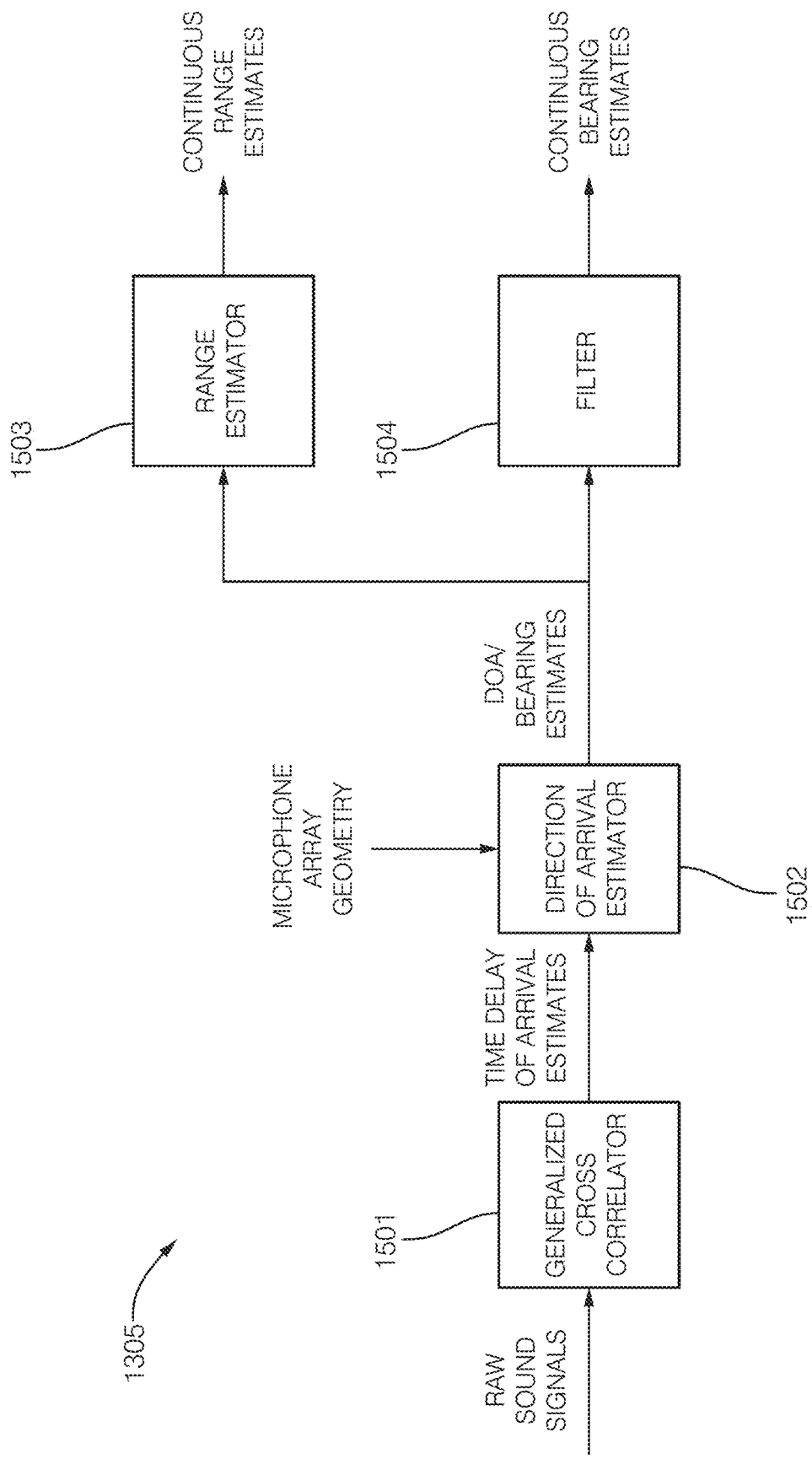
FIG. 15 is a block diagram of the sound source localizer shown in FIG. 13, in accordance with one or more embodiments.

SSL 1305 receives the raw sound signals from microphone array 1301 and the siren signal(s) detected by SED 1304, and estimates the bearing angle and range of the siren signal source(s) (e.g., the location of the emergency vehicle (s)) of detected siren signals, as described in further detail in reference to FIG. 15.

FIG. 15 is a block diagram of SSL 1305 shown in FIG. 13, in accordance with one or more embodiments. SSL 1305 includes generalized cross correlator 1501, direction of arrival (DOA)/bearing estimator 1502, range estimator 1503 and filter 1504.

When SED 1304 detects the presence of a siren signal it informs SSL 1305 of the event using the siren detected signal. Generalized cross correlator 1501 computes time delay of arrival (TDOA) estimates, as described in C. Knapp and G. Carter, "The Generalized Correlation Method For Estimation of Time Delay," *IEEE Transactions on Acoustics, Speech, and Signal Processing,* Vol. 24, No. 4, pp. 320-327, August 1976. The TDOA estimates are input into DOA estimator 1502. DOA estimator 1502 uses the TDOA estimates and a known geometry of microphone array 1301 to estimate the DOA (bearing angle) at each microphone in microphone array 1301 by exploiting spatial-temporal differences of the siren signal at each microphone pair in microphone array 1301. In an embodiment, DOA estimator 1502 implements the techniques described in Jean-Marc Valin, Francois Michaud, Jean Rouat, Dominic Létourneau, "Robust Sound Source Localization Using A Microphone Array on a Mobile Robot," *Proc. IEEE/RSJ International Conference on Intelligent Robots and Systems* (IROS), pp. 1228-1233, 2003.

Using the bearing angle estimate from each microphone array 1301, range estimator 1503 estimates the range of the sound source from the AV using known triangulation methods. The bearing angle estimates are input into filter 1504 which outputs continuous bearing angle estimates. In an embodiment, filter 1504 is a Bayesian filter, including but not limited to a Kalman filter, extended Kalman filter, unscented Kalman filter, particle filter or any other suitable filter that can output continuous bearing angle estimates. Some examples of Kalman filters for outputting continuous bearing estimates are described in Ulrich Klee, Tobias Gehrig, and John McDonough, "Kalman Filters for Time Delay of Arrival-Based Source Localization," *Hindawi Publishing Corporation EURASIP Journal on Applied Signal Processing*, Vol. 2006, Article ID 12378, pp. 1-15.

Figure 16:
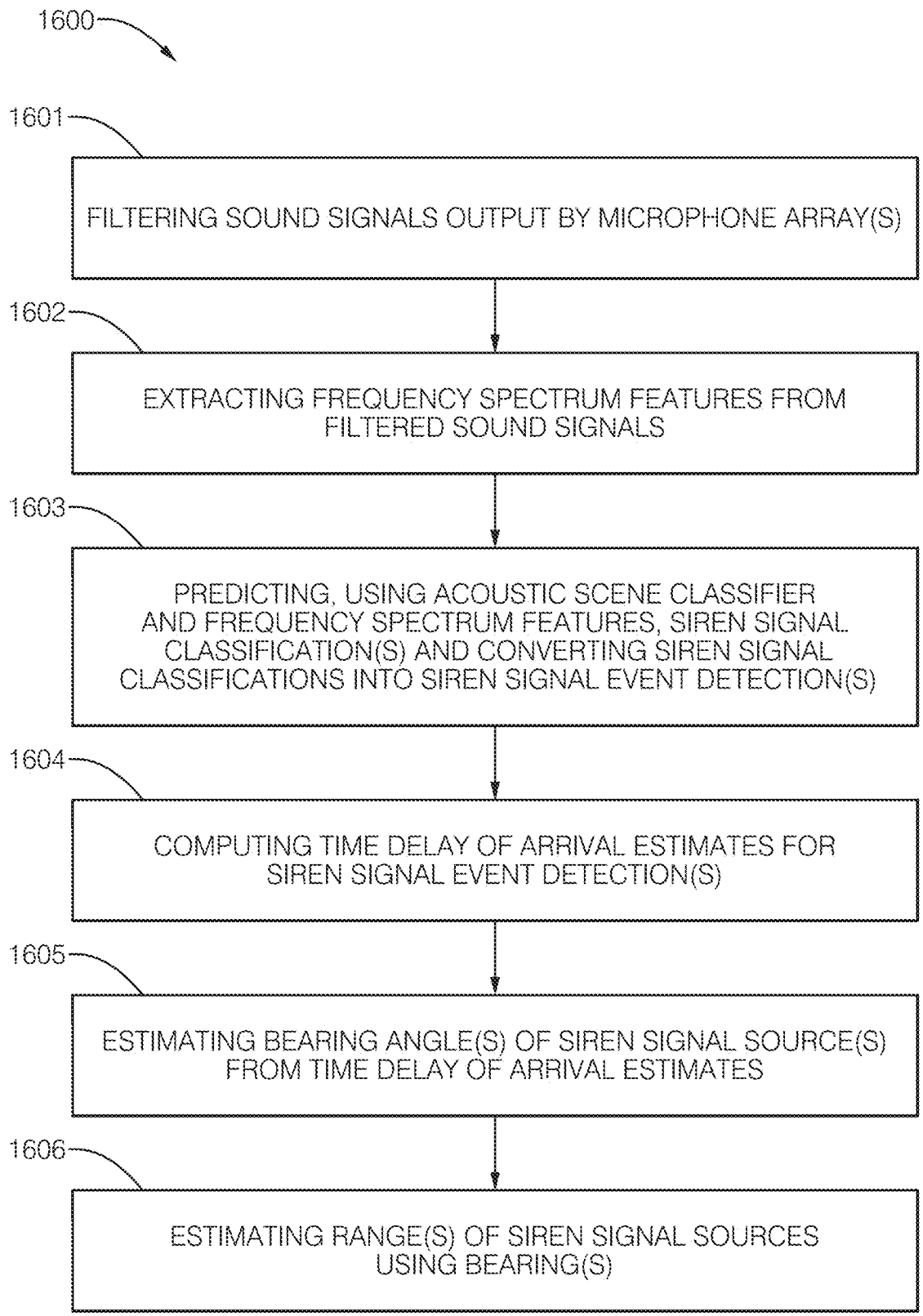
FIG. 16 is a flow diagram of a process if detecting and classifying siren signals, and localizing the siren signal sources in an environment, in accordance with one or more embodiments.

FIG. 16 is a flow diagram of a process 1600 of detecting and classifying siren signals, and localizing the siren signal sources in an environment, in accordance with one or more embodiments. Process 1600 can be implemented using, for example, the computer system 300 described in reference to FIG. 3.

Process 1600 begins by filtering sound signals output by one or more microphone arrays (1601). For example, the passband of a bandpass filter can be configured to pass known frequency ranges of siren signals and attenuate all other frequencies.

Process 1600 continues by extracting frequency spectrum features from the filtered sound signals (1602). For example, the filtered sound signals can be transformed into a 2D time-frequency spectrum that includes, for example, amplitude, frequency and time data. Some examples of extraction algorithms that can be used in time-frequency spectrum feature extraction include but are not limited to: spectrogram, mel-spectrogram, log-mal-spectrogram, mel-frequency MFCC and short term Fourier transform (STFT).

Process 1600 continues by predicting, using an acoustic scene classifier and the frequency spectrum features, siren signal classifications, and converting the siren signal classifications into siren signal event detections (1603). For example, the 2D time-frequency spectrum features can be input into a CNN, which is configured to predict labels indicative of the presence or absence of siren signals in the filtered sound signals. In an embodiment, a sound event detection signal is generated based on the output of the CNN that informs a sound source localizer of the event.

Process 1600 continues by computing time delay of arrival (TDOA) estimates for the siren signal detections (1604). For example, the TDOA estimates can be generated using a maximum likelihood criterion obtained by implementing a generalized cross correlation method, as described in reference to FIG. 15.

Process 1600 continues by estimating DOAs (bearing angles) of the detected siren signals using the TDOA estimates and the known geometry of the microphone array(s) (1605).

Process 1600 continues by tracking the DOAs (bearing angles) using a filter (e.g., an extended Kalman filter) to obtain continuous outputs of bearing angles (1606). Additionally, ranges from the vehicle to the siren signal sources are estimated using the estimated bearing angles and known triangularization algorithms.

After the siren signal source(s) are located, the autonomous vehicle can use the locations to generate a plan, route or trajectory in the environment for the autonomous vehicle to reduce the risk of collision with emergency vehicle(s) or other vehicles or objects in the environment, and/or to avoid traveling in areas where emergency services are being performed (e.g., fires, traffic accidents). The labeled sirens signals and localized siren signal sources can also be fused with other sensor data in a perception pipeline of the autonomous vehicle and/or used by other systems and/or processes of the autonomous vehicle, and/or directly (e.g., V2V communication) or indirectly shared with other autonomous vehicles (e.g., in a fleet of vehicles) through a centralized service platform.

Example AV Handling Logic/Rules Upon Emergency Vehicle Localization

The following is example logic/rules for allowing the AV to negotiate roads and traffic upon a successful emergency vehicle localization.

If an ACTIVE emergency vehicle is detected near an intersection, and the AV has crossed the intersection stop line, the AV will initiate a comfort stop. If, however, the emergency vehicle is far from the intersection, the AV will traverse across the intersection, then initiate a comfort stop.

If the AV is within a left lane, and a right lane is open and available, the AV will begin to merge into the right lane.

If the AV is within the rightmost lane, the AV will bias to the right, if possible but will not cross the white line marking the lane boundary. The AV will then initiate a comfort stop and remain stopped until the following conditions have been met: 1) the emergency vehicle is traveling away from the AV with a range rate that is greater than +x kph (e.g., >+1 kph) for greater than y milliseconds (>2000 ms); and 2) the emergency vehicle range is greater than z meters (e.g., 50 m), or the emergency vehicle is no longer detected for greater than m seconds (e.g., 10 seconds). The AV then resumes its route towards its goal point.

Upon detection of an INACTIVE emergency vehicle (e.g., at the scene of the emergency), the following example handling logic/rules will be implemented.

If the emergency vehicle is located on same road as the AV, but the opposite side, the maximum speed of the AV is limited to 10 mph under the posted speed limit.

If the emergency vehicle is located on a different road, the maximum speed of the AV is limited to 5 mph under the posted speed limit.

If the emergency vehicle is located on the same road and the same side as the AV, but behind the AV, the max speed of the AV is limited to 5 mph under the posted speed limit.

If the emergency vehicle is located on the same road and the same side as the AV but in front of the AV, then: if on a road with multiple same-direction lanes, the AV will merge into a lane that is not adjacent to the lane(s) containing the emergency vehicle. If merging is not possible due to congestion, sensors on the AV will ensure that the lane does not contain the emergency vehicle. If the emergency vehicle is in same lane as the AV, a comfort stop is initiated. The AV will remain stopped until the lane adjacent to the emergency vehicle opens. The AV will then merge into the open lane adjacent the emergency vehicle.

If the AV is on a road with single lane, and the emergency vehicle is located fully on a shoulder area and fully or partly within the AV's lane, a comfort stop is initiated. The AV remains stopped until the emergency vehicle is located fully on the shoulder area. The AV then proceeds with a maximum speed limit of 5 mph, or the AV switches to ACTIVE and travels away from the emergency vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   capturing, by one or more microphone arrays of a vehicle, sound signals in an environment;
   extracting, using one or more processors, frequency spectrum features from the sound signals;
   predicting, using an acoustic scene classifier and the frequency spectrum features, one or more siren signal classifications;
   converting, using the one or more processors, the one or more siren signal classifications into one or more siren signal event detections;
   computing time delay of arrival estimates for the one or more siren signal event detections;
   estimating, using the one or more processors, one or more bearing angles to one or more sources of the one or more siren signal event detections using the time delay of arrival estimates and a known geometry of the one or more microphone arrays; and
   tracking, using a Bayesian filter, the one or more bearing angles,
   wherein predicting, using an acoustic scene classifier and the frequency spectrum features, one or more siren signal classifications, further comprises continuously predicting labels indicating the presence or absence of the one or more siren signals and their respective start and end times.

2. The method of claim 1, wherein the time delay of arrival estimates are computed using a maximum likelihood criterion obtained by implementing a generalized cross correlation method.

3. The method of claim 1, further comprising:
   estimating one or more ranges of the one or more siren signal sources by applying triangularization to the one or more bearing angles.

4. The method of claim 1, wherein transforming sound signals into frequency spectrum features includes generating one of a spectrogram, mel-spectrogram or mel-frequency cepstral coefficients (MFCC).

5. The method of claim 1, wherein the acoustic scene classifier is implemented at least in part using a convolutional neural network (CNN).

6. The method of claim 1, wherein the Bayesian filter is one of a Kalman filter, extended Kalman filter (EKF), unscented Kalman filter or particle filter.

7. The method of claim 1, wherein the one or more bearing angles are estimated by using a spatio-temporal difference of the one or more siren signal event detections at each microphone pair in the microphone array.

8. The method of claim 1, wherein the acoustic scene classifier predicts labels that indicate the presence of different types of siren signals.

9. The method of claim 8, wherein the different types of siren signals include at least wailing, yelp, hi-lo, rumbler, and mechanical wail siren signals.

10. The method of claim 1, wherein a plurality of the one or more bearing angles are used to triangulate the location of the sound source.

11. The method of claim 10, wherein the vehicle is an autonomous vehicle, and wherein the sound source is associated with an emergency vehicle and the method further comprises:
    causing, using the one or more processors and the location of the sound source, to operate the autonomous vehicle in accordance with one or more rules associated with emergency vehicles.

12. The method of claim 11, further comprising: determining whether the emergency vehicle is active or inactive, and if active, operating the autonomous vehicle in accordance with a first set of rules associated with active emergency vehicles, or if inactive, operating the autonomous vehicle in accordance with a second set of rules associated with an inactive emergency vehicles.

13. The method of claim 12, wherein if the emergency vehicle is active and nearby and the autonomous vehicle has crossed a stop line at an intersection, causing the autonomous vehicle to initiate a comfort stop, or if the emergency vehicle is active and far away and the autonomous vehicle has crossed the stop line, causing the autonomous vehicle to traverse across the intersection and then initiate a comfort stop.

14. The method of claim 12, wherein the emergency vehicle is active and the autonomous vehicle is within a left lane, and a right lane is open and available, causing the autonomous vehicle to merge into the right lane.

15. The method of claim 12, wherein the emergency vehicle is active and the autonomous vehicle is within the rightmost lane, causing the autonomous vehicle to bias to the right, if possible but not cross the lane boundary, and then initiate a comfort stop and remains stopped until the following conditions are met: 1) the emergency vehicle is traveling away from the autonomous vehicle with a range rate that is greater than a specified speed for greater than a specified time; and 2) the emergency vehicle range is greater than a specified distance, or the emergency vehicle is no longer detected for greater than a specified time, and if the conditions are met causing the autonomous vehicle to resume its route towards a goal point.

16. The method of claim 12, wherein the emergency vehicle is inactive, the method further comprising:
  determining whether the autonomous vehicle is on a same road as the emergency vehicle;
  determining whether the autonomous vehicle is on the same side of the road or an opposite side of the road as the emergency vehicle;
  if on the same road as the emergency vehicle,
    determining whether the autonomous vehicle is in in front or of behind the emergency vehicle; and
  causing the autonomous vehicle to travel a trajectory to avoid collision with the emergency vehicle based on whether the autonomous vehicle is on the same road or a different road, the same side of road or the opposite side, and if on the same side of the road whether the autonomous vehicle is in front of or behind the emergency vehicle.

17. The method of claim 12, wherein the emergency vehicle is inactive, further comprising:
  determining that the autonomous vehicle is on a road with single lane, and the emergency vehicle is located fully on a shoulder area and fully or partly within a lane in which the autonomous vehicle is traveling; and
  causing the autonomous vehicle to initiate a comfort stop is initiated; and
  causing the autonomous vehicle to remain stopped until the emergency vehicle is located fully on the shoulder area, and then to proceed with a maximum speed limit or switch to active and travel away from the emergency vehicle.

18. A system comprising:
  one or more microphone arrays;
  one or more processors;
  memory storing instructions that when executed by the one or more processors, cause the one or more processors to perform operations comprising:
    capturing, by the one or more microphone arrays, sound signals in an environment;
    extracting frequency spectrum features from the sound signals;
    predicting, using an acoustic scene classifier and the frequency spectrum features, one or more siren signal classifications;
    converting the one or more siren signal classifications into one or more siren signal event detections;
    computing time delay of arrival estimates for the one or more siren signal event detections;
    estimating, using the one or more processors, one or more bearing angles to one or more sources of the one or more siren signal event detections using the time delay of arrival estimates and a known geometry of the one or more microphone arrays; and
    tracking, using a Bayesian filter, the one or more bearing angles;
  wherein predicting, using an acoustic scene classifier and the frequency spectrum features, one or more siren signal classifications, further comprises continuously predicting labels indicating the presence or absence of the one or more siren signals and their respective start and end times.

19. The system of claim 18, wherein the time delay of arrival estimates are computed using a maximum likelihood criterion obtained by implementing a generalized cross correlation method on the one or more processors.

20. A method comprising:
  capturing, by one or more microphone arrays of a vehicle, sound signals in an environment;
  extracting, using one or more processors, frequency spectrum features from the sound signals;
  predicting, using an acoustic scene classifier and the frequency spectrum features, one or more siren signal classifications;
  converting, using the one or more processors, the one or more siren signal classifications into one or more siren signal event detections;
  computing time delay of arrival estimates for the one or more siren signal event detections;
  estimating, using the one or more processors, one or more bearing angles to one or more sources of the one or more siren signal event detections using the time delay of arrival estimates and a known geometry of the one or more microphone arrays; and
  tracking, using a Bayesian filter, the one or more bearing angles; wherein a plurality of the one or more bearing angles are used to triangulate the location of the sound source.

21. The method of claim 20, wherein the vehicle is an autonomous vehicle, and wherein the sound source is associated with an emergency vehicle and the method further comprises:
  causing, using the one or more processors and the location of the sound source, to operate the autonomous vehicle in accordance with one or more rules associated with emergency vehicles.

22. The method of claim 20, further comprising:
  determining whether the emergency vehicle is active or inactive, and if active, operating the autonomous vehicle in accordance with a first set of rules associated with active emergency vehicles, or if inactive, operating the autonomous vehicle in accordance with a second set of rules associated with an inactive emergency vehicles.

23. The method of claim 22, wherein if the emergency vehicle is active and nearby and the autonomous vehicle has crossed a stop line at an intersection, causing the autonomous vehicle to initiate a comfort stop, or if the emergency vehicle is active and far away and the autonomous vehicle has crossed the stop line, causing the autonomous vehicle to traverse across the intersection and then initiate a comfort stop.

24. The method of claim 22, wherein the emergency vehicle is active and the autonomous vehicle is within a left lane, and a right lane is open and available, causing the autonomous vehicle to merge into the right lane.

25. The method of claim 22, wherein the emergency vehicle is active and the autonomous vehicle is within the rightmost lane, causing the autonomous vehicle to bias to the right, if possible but not cross the lane boundary, and then initiate a comfort stop and remains stopped until the following conditions are met: 1) the emergency vehicle is traveling away from the autonomous vehicle with a range rate that is greater than a specified speed for greater than a specified time; and 2) the emergency vehicle range is greater than a specified distance, or the emergency vehicle is no longer detected for greater than a specified time, and if the conditions are met causing the autonomous vehicle to resume its route towards a goal point.

26. The method of claim 22, wherein the emergency vehicle is inactive, the method further comprising:

determining whether the autonomous vehicle is on a same road as the emergency vehicle;
determining whether the autonomous vehicle is on the same side of the road or an opposite side of the road as the emergency vehicle;
if on the same road as the emergency vehicle,
determining whether the autonomous vehicle is in in front or of behind the emergency vehicle; and
causing the autonomous vehicle to travel a trajectory to avoid collision with the emergency vehicle based on whether the autonomous vehicle is on the same road or a different road, the same side of road or the opposite side, and if on the same side of the road whether the autonomous vehicle is in front of or behind the emergency vehicle.

27. The method of claim 22, wherein the emergency vehicle is inactive, further comprising:
determining that the autonomous vehicle is on a road with single lane, and the emergency vehicle is located fully on a shoulder area and fully or partly within a lane in which the autonomous vehicle is traveling; and
causing the autonomous vehicle to initiate a comfort stop is initiated; and
causing the autonomous vehicle to remain stopped until the emergency vehicle is located fully on the shoulder area, and then to proceed with a maximum speed limit or switch to active and travel away from the emergency vehicle.

28. The method of claim 20, wherein the time delay of arrival estimates are computed using a maximum likelihood criterion obtained by implementing a generalized cross correlation method.

29. The method of claim 20, further comprising:
estimating one or more ranges of the one or more siren signal sources by applying triangularization to the one or more bearing angles.

30. The method of claim 20, wherein transforming sound signals into frequency spectrum features includes generating one of a spectrogram, mel-spectrogram or mel-frequency cepstral coefficients (MFCC).

31. The method of claim 20, wherein the acoustic scene classifier is implemented at least in part using a convolutional neural network (CNN).

32. The method of claim 20, wherein the Bayesian filter is one of a Kalman filter, extended Kalman filter (EKF), unscented Kalman filter or particle filter.

33. The method of claim 20, wherein predicting, using an acoustic scene classifier and the frequency spectrum features, one or more siren signal classifications, further comprises continuously predicting labels indicating the presence or absence of the one or more siren signals.

34. The method of claim 20, wherein the one or more bearing angles are estimated by using a spatio-temporal difference of the one or more siren signal event detections at each microphone pair in the microphone array.

35. The method of claim 20, wherein the acoustic scene classifier predicts labels that indicate the presence of different types of siren signals.

36. The method of claim 35, wherein the different types of siren signals include at least wailing, yelp, hi-lo, rumbler, and mechanical wail siren signals.

37. A system comprising:
one or more microphone arrays;
one or more processors;
memory storing instructions that when executed by the one or more processors, cause the one or more processors to perform operations comprising:
capturing, by the one or more microphone arrays, sound signals in an environment;
extracting frequency spectrum features from the sound signals;
predicting, using an acoustic scene classifier and the frequency spectrum features, one or more siren signal classifications;
converting the one or more siren signal classifications into one or more siren signal event detections;
computing time delay of arrival estimates for the one or more siren signal event detections;
estimating, using the one or more processors, one or more bearing angles to one or more sources of the one or more siren signal event detections using the time delay of arrival estimates and a known geometry of the one or more microphone arrays; and
tracking, using a Bayesian filter, the one or more bearing angles;
wherein a plurality of the one or more bearing angles are used to triangulate the location of the sound source.

38. The system of claim 37, estimating one or more ranges of the one or more siren signal sources by applying triangularization to the one or more bearing angles.

39. The system of claim 37, wherein predicting, using an acoustic scene classifier and the frequency spectrum features, one or more siren signal classifications, further comprises continuously predicting labels indicating the presence or absence of the one or more siren signals.

* * * * *

UNITED STATES PATENT AND TRADEMARK OFFICE
CERTIFICATE OF CORRECTION

| | |
|---|---|
| PATENT NO. | : 11,295,757 B2 |
| APPLICATION NO. | : 16/752595 |
| DATED | : April 5, 2022 |
| INVENTOR(S) | : Buddhadev et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 15 days.

Signed and Sealed this
Seventh Day of February, 2023

Katherine Kelly Vidal
*Director of the United States Patent and Trademark Office*